2 Sheets—Sheet 1.

H. G. GILES.
Magazine Stove.

No. 101,001. Patented March 22, 1870.

Witnesses:
Leonard H. Giles
Jno. W. Rorabach

Inventor:
H. G. Giles.

H. G. GILES.
Magazine Stove.
No. 101,001.
2 Sheets—Sheet 2.
Patented March 22, 1870.
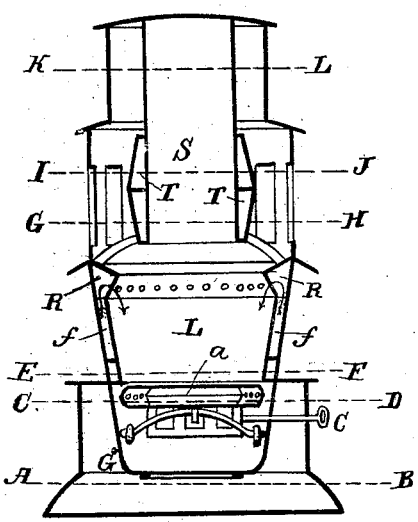
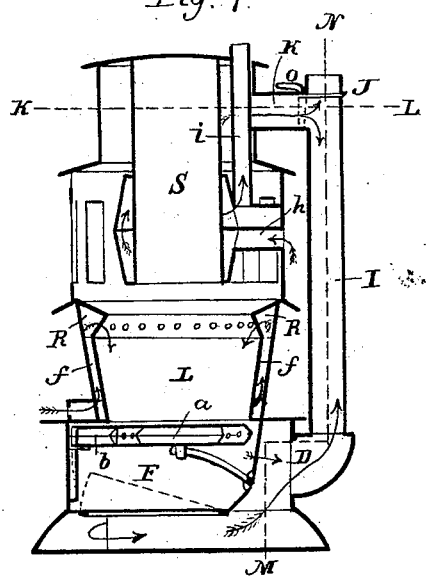
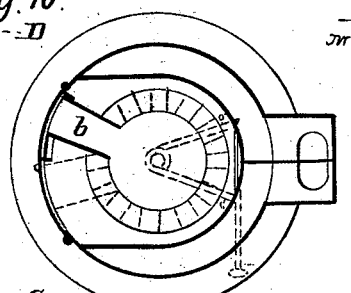
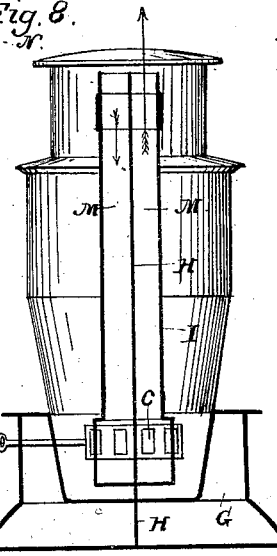
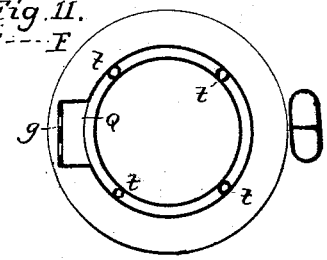
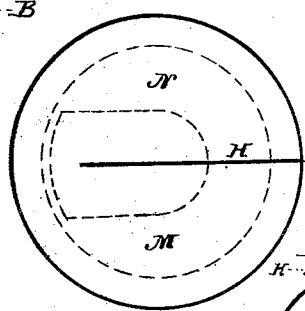
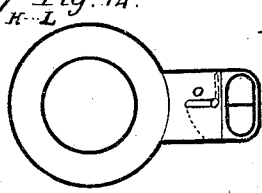
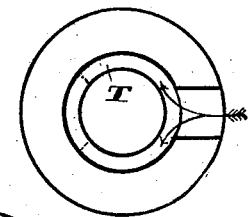
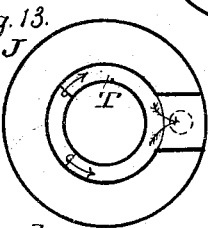
Witnesses
Leonard H. Giles
Jno. W. Roraback
Inventor
H. G. Giles

United States Patent Office.

HENRY G. GILES, OF TROY, NEW YORK.

Letters Patent No. 101,001, dated March 22, 1870.

IMPROVEMENT IN BASE-BURNING STOVES.

The Schedule referred to in these Letters Patent and making part of the same.

Be it known that I, HENRY G. GILES, of Troy, in the county of Rensselaer, in the State of New York, have invented a new and useful Improvement in Base-Burning Stoves; and I do hereby declare that the following is a full and exact description thereof, reference being had to the accompanying drawings and the letters of reference marked thereon.

The nature of my invention consists—

First, in the introducing into a base-burning stove, above the fire-pot, and forming part of the magazine, a horizontal flue or flues, arranged so as to take in cold air and pass it out hot, for the double purpose of adding to the heating-power of the stove and preserving the magazine from burning out.

Secondly, the introduction into said stove of a chamber at the bottom of the fire-pot, where, when air is admitted, it will be heated, and passed thence by any device up to or near the top of fire-pot, and combined with the inflammable gases, for the purpose of igniting the same.

Thirdly, the use in said stove of a hollow grate, for the purpose of admitting a draught of hot air to the fuel, and securing thereby a more perfect combustion thereof.

Fourthly, the returning of the heated product of combustion to the bottom part of said stove, by means of an outside pipe or flue, divided in the middle, so as to make a continuous downward and upward flue, starting from a point above the top of fire-pot.

Fifthly, the construction of the plate forming the ash-pit, for the purpose of giving a freer space for the product of combustion to circulate, and also to save expense in manufacturing.

Description of the Accompanying Drawings.

Figure 1:
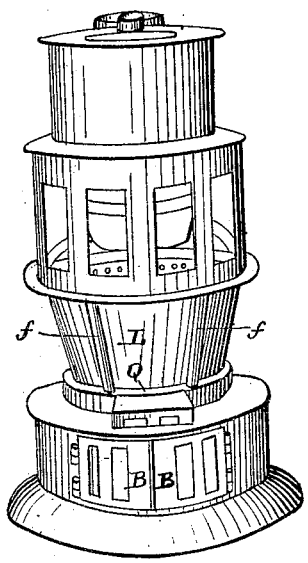
Figure 2:
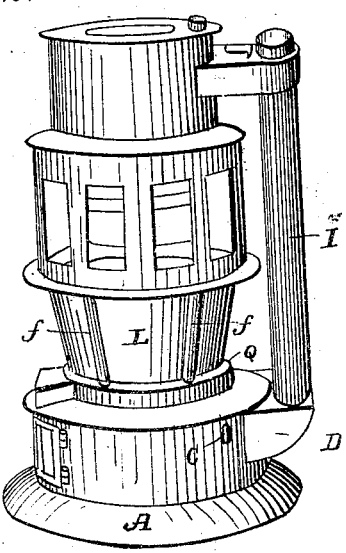
Figure 2:
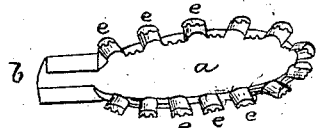
Figure 4:
Figure 4:
Figure 3:
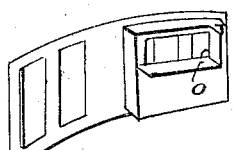
Figure 3:
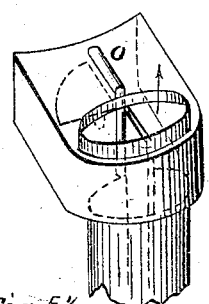
Figure 5:
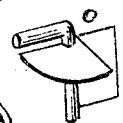
Figure 5:
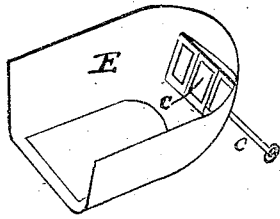
Figure 5:
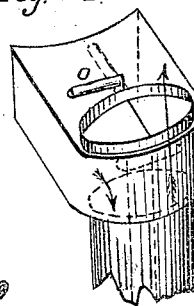

Figure 1 is a perspective front view.
Figure 2, a perspective side view.
Figure 3, inside of doors, in base.
Figure 3½, the walls and floor of the ash-pit.
Figure 4, the grate complete.
Figure 4¼, the upper half of grate.
Figure 4½, the under half of grate.
Figure 5, the back damper in connecting-pipe.
Figure 5¼, the upper part of said pipe, showing damper open for direct draught.
Figure 5½, the same, showing damper arranged for down or reverting draught.
Figure 6, a vertical transverse section of stove.
Figure 7, a vertical section from front to rear.
Figure 8, a vertical section on line M N.
Figure 9, a horizontal section on line A B.
Figure 10, a horizontal section on line C D.
Figure 11, a horizontal section on line E F.
Figure 12, a horizontal section on line G H.
Figure 13, a horizontal section on line I J.
Figure 14, a horizontal section on line K L.

Here are two sheets of drawings, entitled, respectively, Sheet I and Sheet II.

Construction.

A is the base of stove.
B B, doors to ash-pit.
C is dust-damper handle.
D is back flue.

In the base E is the scoop-shovel shaped plate E, which forms the ash-pit F; and between the bottom and sides of it and the bottom and sides of the base A is the space G, which is divided by the flue-strip H, except in the front the strip is cut short about one-third the diameter of bottom space.

In order to let the space on one side communicate with that of the other, said flue-strip H is continued up the pipe I to the upper side of the connecting-flue at J, and the space G is also continued up said pipe to the point J. The collar above J is to receive the exit-pipe leading to the chimney.

From the connecting-pipe K, at the point J, we have formed in the pipe I, standing out from the body of the stove, and independent of the fire-pot L, the downward flue M, which is continued down into the base to the end of the flue-strip H, and around the end of said flue-strip into the other or continued flue N, and thence up the said flue N in the pipe I to the exit-pipe. Thus is formed one continuous flue, by means of said flues M and N, from the point J down M into one side of base A, around the end of flue-strip H, into flue N, to the point J.

The changing of a direct draught through the pipe K and exit-pipe to a reverting or downward and returning draught is effected by the double-acting damper O, which, when turned, closes at the same time the passage from gas or smoke-chamber to flue N, that it shuts off flue M with the exit-pipe.

The advantage of thus arranging a revertible flue for throwing the heated product of combustion into the base to obtain its unspent heat before passing into the exit-pipe, by means of an outstanding pipe, leaves the full surface of the fire-pot on all sides unobstructed for radiation, which I consider important, from the fact that when the draughts are closed and the product of combustion ceases, we have still left the latent heat of the ignited coals radiating through the unobstructed sides of the fire-pot into the room. Otherwise that heat is in a great measure lost.

In the form of the plate E are several advantages: first, an ash-pit is formed with less iron than when made in the usual way, by separate plates; second, saves labor in molding and mounting; third, opens a chamber on the outer sides larger toward the bottom, where a heavier heat is desired.

In the ash-pit, and at the bottom of the fire-pot, is the grate P, peculiar in construction, and to answer three purposes, viz: first, to sustain the fuel in the fire-pot; second, to admit fresh air for promoting combustion; third, to heat said air to produce a more perfect combustion.

$d$ is the hollow center, without openings in the upper or lower part. It is made in two parts, upper and lower, with hollow prongs $e$ $e$ on the sides, as shown in figs. $4\frac{1}{4}$ and $4\frac{1}{2}$, and a hollow shank, $b$. Large jets or holes are made on the sides of the prongs and in the ends of same, also in the central cavity $a$, between the prongs; and the shank being open from the outer end to the central cavity, fresh air in large quantities is admitted into said cavity, and from thence, in a highly-heated state, is passed through the surrounding jets or openings mentioned to the burning fuel lying against the sides of the fire-pot, thus causing the fire to burn against the sides of the fire-pot, rather than in the center of the mass of coal in the fire-pot. The gravity of the column of coal settling in the center forces fresh coal to the sides of the fire-pot, where the combustion is kept up by this arrangement, thus counteracting the tendency of combustion to the center of the fuel, and bringing it to the surface, where it is more available for heating purposes, and also by thus heating the air before introducing it to the fuel, the refrigerating effect of cold air to the fuel is overcome, and combustion is quicker and more perfect.

At the bottom of the fire-pot is an annular chamber, Q, provided on one side with the opening (forming the shank) $g$, for the admission of fresh air, and leading up from said chamber are four small pipes, $f$, and which enter the chamber R at or near the top of the fire-pot, which is an annular chamber, perforated on the inner side. The purpose of the chamber Q, the pipes $f$, and chamber R is to introduce through them hot air to the top or near the top of the burning coals, to ignite and consume the inflammable gases evolving from the combustion in fire-pot, the admission of air being controlled by a damper at the end of the shank or opening $g$.

At the lower end of the magazine S, and making part of the same, is the double flue T. A cross-section would be similar in form to a double cone. It is divided horizontally in the middle by the flue-strip $h$, except a space about one-fourth of the diameter, by which the chamber of the lower side opens into the upper part. To the lower chamber an opening is made, reaching through the side of the stove, for the admission of air, (see fig. 12,) which is made to pass in two currents to the opposite side, and thence up past the ends of the flue-strip $h$ into the upper chamber, (see fig. 13,) and passing back in two currents to the upright flue or pipe $i$, is thence passed out into the room where said stove may stand, or by attaching a pipe it may be conducted to an upper room.

The advantages of this double flue at this point are: first, the cold air admitted to the lower portion, and impinging its surface in passing through its space to its outlet in the upper portion, has a strong tendency to preserve the iron from burning out; and second, it adds to the heating capacity of the stove, which otherwise could not be available.

The same thing may be partially effected without the flue-strip $h$, and by making more openings on the sides of said flues for the admission of air-modifications which I may desire to make hereafter.

*Claims.*

1. In combination with the fire-pot L, the magazine S and the flue-pipe I, the continuous flue M and N, as and for the purposes herein set forth.

2. In the same combination, the flue-strip H, as herein set forth.

3. In combination with fire-pot L and magazine S, the chamber Q, as herein set forth.

4. In combination with the chamber Q and the pipes $f$, or their equivalent, the chamber R, as and for the purposes herein set forth.

5. The flue T, constructed substantially as described, and divided by plate $h$, as shown and described and for the purpose specified.

6. The flue T, divided by the plate $h$, in combination with the pipe $i$, or its equivalent, substantially in the manner and for the purpose herein set forth.

7. The flue-strip $h$ or equivalent, in combination with the upper and lower portions of the flue or flues T.

8. The form and construction of the ash-pit plate E, as and for the purposes herein set forth.

H G. GILES.

Witnesses:
LEONARD H. GILES,
JNO. W. RORABACK.